US012793091B2

(12) United States Patent
Jacobson et al.

(10) Patent No.: US 12,793,091 B2
(45) **Date of Patent: *Nov. 10, 2026**

(54) DETECTING CHANGES IN CUSTOMER (USER) BEHAVIOR

(71) Applicant: Klaviyo, Inc., Boston, MA (US)

(72) Inventors: Olof Jacobson, London (GB); Harsh Mehta, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 128 days.

This patent is subject to a terminal disclaimer.

(21) Appl. No.: 18/820,462

(22) Filed: Aug. 30, 2024

(65) Prior Publication Data

US 2024/0420165 A1 Dec. 19, 2024

Related U.S. Application Data

(63) Continuation of application No. 17/860,277, filed on Jul. 8, 2022, now Pat. No. 12,112,343.

(60) Provisional application No. 63/313,636, filed on Feb. 24, 2022.

(51) Int. Cl.

*G06Q 30/0201* (2023.01)
*G06Q 20/20* (2012.01)
*G06Q 30/0202* (2023.01)

(52) U.S. Cl.

CPC ......... *G06Q 30/0201* (2013.01); *G06Q 20/20* (2013.01); *G06Q 30/0202* (2013.01)

(58) Field of Classification Search

None

See application file for complete search history.

(56) References Cited

U.S. PATENT DOCUMENTS

| | | | |
|---|---|---|---|
| 7,505,868 | B1 | 3/2009 | Shan |
| 7,809,781 | B1 | 10/2010 | Shan |
| 7,953,280 | B2 | 5/2011 | Theiler et al. |

(Continued)

OTHER PUBLICATIONS

Song, Hee Seok, Jae kyeong Kim, and Soung Hie Kim. "Mining the change of customer behavior in an internet shopping mall." Expert systems with applications 21.3 (2001): 157-168 (Year: 2001).*

(Continued)

*Primary Examiner* — Darlene Garcia-Guerra
(74) *Attorney, Agent, or Firm* — Brian R. Short

(57) ABSTRACT

Apparatuses, methods, and systems for detecting changes in customer behavior are disclosed. One method includes detecting customer action data, receiving, by a marketing platform server, the customer action data over a period of time, determining, customer parameters including a mean, and a standard deviation of the customer action data, generating a normalization value when the standard deviation is detected to be less than a deviation threshold, calculating, by the marketing platform server, a value of deviation from expectation based at least on the mean, the normalization value, and a noise factor, calculating a current cumulative sum value of the customer action data based on a prior cumulative sum value and the value of the deviation from expectation, comparing the current cumulative sum value with a threshold, and generating an electronic communication for the merchant server when the current cumulative sum value satisfies a compared condition with the preselected threshold.

18 Claims, 11 Drawing Sheets

(56) References Cited

U.S. PATENT DOCUMENTS

| | | | |
|---|---|---|---|
| 9,565,203 | B2 | 2/2017 | Bernstein et al. |
| 9,752,960 | B2 * | 9/2017 | Angello .................. F23N 5/242 |
| 9,767,474 | B1 * | 9/2017 | Ramalingam ...... G06Q 30/0261 |
| 10,951,500 | B2 | 3/2021 | Lu et al. |
| 11,270,312 | B1 | 3/2022 | Jass |
| 11,663,297 | B2 | 5/2023 | Boyapalle et al. |
| 2002/0002485 | A1 * | 1/2002 | O'Brien ............... G06Q 20/204 705/14.13 |
| 2002/0136430 | A1 | 9/2002 | Rhoads |
| 2005/0273384 | A1 * | 12/2005 | Fraser ................ G06Q 30/0242 705/14.41 |
| 2009/0307028 | A1 | 12/2009 | Eldon et al. |
| 2010/0106586 | A1 | 4/2010 | Etheredge et al. |
| 2012/0086573 | A1 | 4/2012 | Bischoff et al. |
| 2013/0290096 | A1 * | 10/2013 | Lizotte, III ........ G06Q 30/0246 705/14.45 |
| 2013/0325770 | A1 | 12/2013 | Heidasch |
| 2015/0046224 | A1 | 2/2015 | Adjaoute |
| 2016/0162917 | A1 | 6/2016 | Singh et al. |
| 2016/0302709 | A1 | 10/2016 | Mossbridge |
| 2017/0083937 | A1 | 3/2017 | Fadli |
| 2017/0094361 | A1 | 3/2017 | Thomas |
| 2017/0220943 | A1 * | 8/2017 | Duncan ..................... G06F 8/38 |
| 2017/0236060 | A1 | 8/2017 | Ignatyev |
| 2018/0053114 | A1 | 2/2018 | Adjaoute |
| 2018/0096365 | A1 * | 4/2018 | Noyes .................... G06Q 40/04 |
| 2018/0248902 | A1 | 8/2018 | Dãnilã-Dumitrescu et al. |
| 2019/0164181 | A1 | 5/2019 | Adjaoute |
| 2019/0228329 | A1 | 7/2019 | Utsumi et al. |
| 2019/0373007 | A1 | 12/2019 | Salunke et al. |
| 2019/0377818 | A1 | 12/2019 | Andritsos |
| 2020/0067861 | A1 | 2/2020 | Leddy et al. |
| 2020/0067952 | A1 | 2/2020 | Deaguero et al. |
| 2020/0322703 | A1 | 10/2020 | Bures et al. |
| 2021/0004682 | A1 | 1/2021 | Gong et al. |
| 2021/0168042 | A1 | 6/2021 | Mijumbi et al. |
| 2021/0326586 | A1 | 10/2021 | Sorci |
| 2021/0374755 | A1 * | 12/2021 | Manske ............. G06Q 20/4016 |
| 2022/0198263 | A1 * | 6/2022 | Guo ...................... G06F 16/215 |
| 2023/0089904 | A1 | 3/2023 | Prasad et al. |
| 2023/0267479 | A1 | 8/2023 | Jacobson et al. |
| 2023/0267480 | A1 | 8/2023 | Jacobson et al. |
| 2023/0269264 | A1 | 8/2023 | Yao et al. |
| 2025/0358210 | A1 | 11/2025 | Ruhela et al. |

OTHER PUBLICATIONS

Huang, Cheng-Kui, Ting-Yi Chang, and Badri G. Narayanan. "Mining the change of customer behavior in dynamic markets." Information Technology and Management 16.2 (2015): 117-138 (Year: 2015).*

Bhatia, Sumit, et al. "Monitoring and analyzing customer feedback through social media platforms for identifying and remedying customer problems." Proceedings of the 2013 IEEE/ACM International Conference on Advances in Social Networks Analysis and Mining. 2013 (Year: 2013).*

Al-Mashraie, Mohammed, Sung Hoon Chung, and Hyun Woo Jeon. "Customer switching behavior analysis in the telecommunication industry via push-pull-mooring framework: A machine learning approach." Computers & Industrial Engineering 144 (2020): 106476 (Year: 2020).

Khade, Anindita A. "Performing customer behavior analysis using big data analytics." Procedia computer science 79 (2016): 986-992 (Year: 2016).

V. R. Bracamonte Lesma and H. Okada, "Feedback and trust-related factors of consumer behavior in cross-border electronic commerce," 2012 IEEE Conference on Technology and Society in Asia (T&SA), Singapore, 2012, pp. 1-5 (Year: 2012).

* cited by examiner

| Day | Daily count of viewed product events |
| --- | --- |
| 2022-01-01 | 100 |
| 2022-01-02 | 121 |
| 2022-01-03 | 113 |
| 2022-01-04 | 93 |
| 2022-01-05 | 140 |
| 2022-01-06 | 102 |
| 2022-01-07 | 98 |

Figure 6:
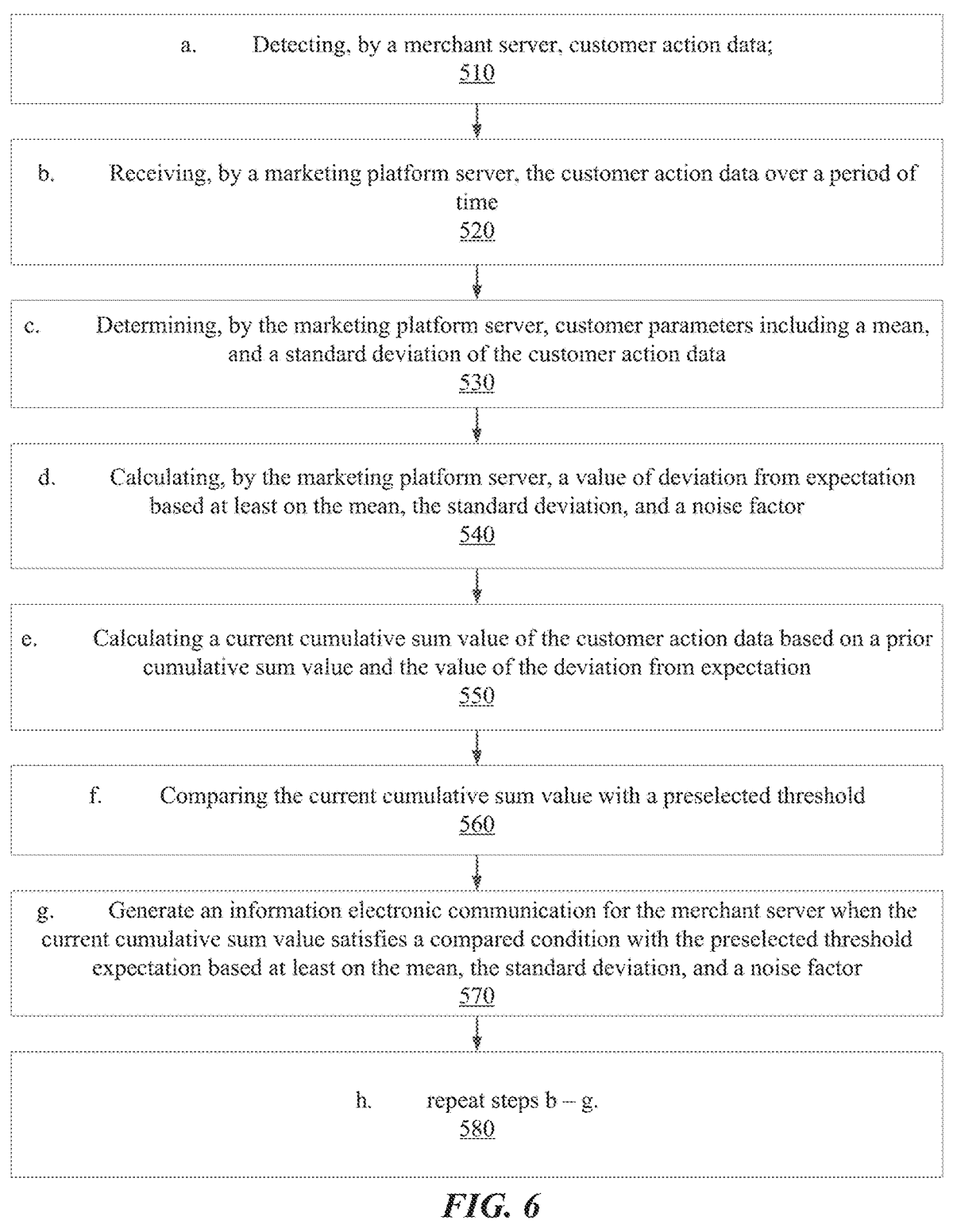

*FIG. 4* a. Detecting, by a merchant server, customer action data;
510

↓ b. Receiving, by a marketing platform server, the customer action data over a period of time
520

↓ c. Determining, by the marketing platform server, customer parameters including a mean, and a standard deviation of the customer action data
530

↓ d. Calculating, by the marketing platform server, a value of deviation from expectation based at least on the mean, the standard deviation, and a noise factor
540

↓ e. Calculating a current cumulative sum value of the customer action data based on a prior cumulative sum value and the value of the deviation from expectation
550

↓ f. Comparing the current cumulative sum value with a preselected threshold
560

↓ g. Generate an information electronic communication for the merchant server when the current cumulative sum value satisfies a compared condition with the preselected threshold expectation based at least on the mean, the standard deviation, and a noise factor
570

↓ h. repeat steps b – g.
580

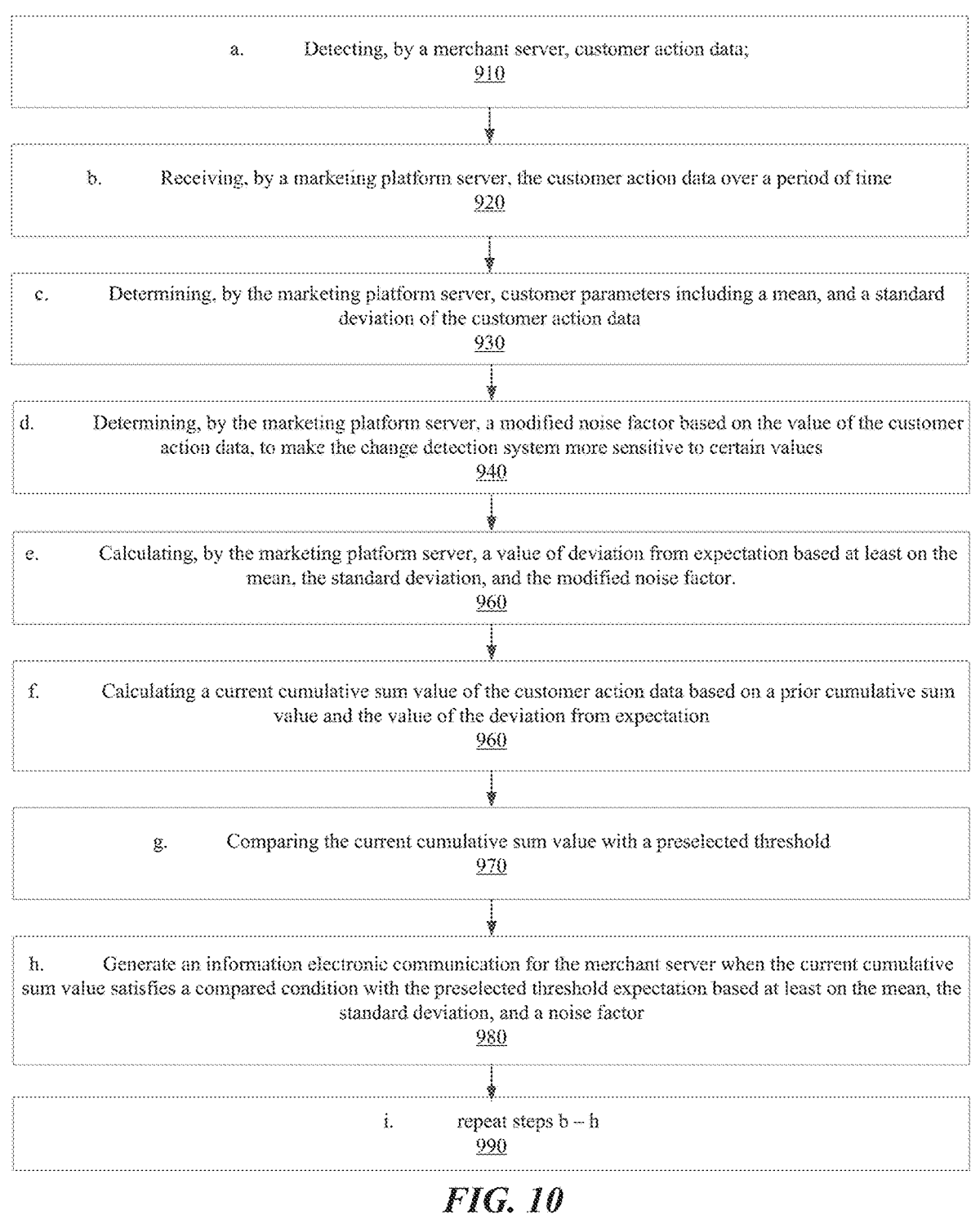

*FIG. 6* a. Detecting, by a merchant server, customer action data;
910 b. Receiving, by a marketing platform server, the customer action data over a period of time
920 c. Determining, by the marketing platform server, customer parameters including a mean, and a standard deviation of the customer action data
930 d. Determining, by the marketing platform server, a modified noise factor based on the value of the customer action data, to make the change detection system more sensitive to certain values
940 e. Calculating, by the marketing platform server, a value of deviation from expectation based at least on the mean, the standard deviation, and the modified noise factor.
960 f. Calculating a current cumulative sum value of the customer action data based on a prior cumulative sum value and the value of the deviation from expectation
960 g. Comparing the current cumulative sum value with a preselected threshold
970 h. Generate an information electronic communication for the merchant server when the current cumulative sum value satisfies a compared condition with the preselected threshold expectation based at least on the mean, the standard deviation, and a noise factor
980 i. repeat steps b – h
990

*FIG. 10*

DETECTING CHANGES IN CUSTOMER (USER) BEHAVIOR

RELATED PATENT APPLICATIONS

This patent application is a continuation of U.S. patent application Ser. No. 17/860,277 filed Jul. 8, 2022, which claims priority to Provisional Patent Application Ser. No. 63/313,636 filed Feb. 24, 2022, which are herein incorporated by reference.

FIELD OF THE DESCRIBED EMBODIMENTS

The described embodiments relate generally to intelligent electronic customer action management. More particularly, the described embodiments relate to systems, methods, and apparatuses for detecting changes in customer behavior of a merchant.

BACKGROUND

In general, a change detection system tries to identify when the output distribution of a process has changed. Change detection becomes extra difficult when the output distribution of the process is unknown to begin with. This means the change detection system must try to determine both what the normal output of the process is, as well as if, and when a change has occurred from this normal state.

It is desirable to have methods, apparatuses, and systems for detecting changes in customer behavior of a merchant.

SUMMARY

An embodiment includes a computer-implemented method of detecting changes in customer behavior. The method includes detecting, by a merchant server, customer action data, receiving, by a marketing platform server, the customer action data over a period of time, determining, by the marketing platform server, customer parameters including a mean, and a standard deviation of the customer action data, generating a normalization value when the standard deviation is detected to be less than a deviation threshold, calculating, by the marketing platform server, a value of deviation from expectation based at least on the mean, the normalization value, and a noise factor, calculating a current cumulative sum value of the customer action data based on a prior cumulative sum value and the value of the deviation from expectation, comparing the current cumulative sum value with a preselected threshold, and generating an informative electronic communication for the merchant server when the current cumulative sum value satisfies a compared condition with the preselected threshold.

An embodiment includes a computer-implemented system for detecting changes in customer behavior. The system includes a merchant server electronically connected to a plurality of customer devices, the merchant server operative to detect customer action data from the customer devices, and a marketing platform server electronically connected to the merchant server. The marketing platform is operative to a. receive the customer action data over a period of time, b. determine customer parameters including a mean, and a standard deviation of the customer action data, c. generate a normalization value based on the standard deviation when the standard deviation is detected to be less than a deviation threshold, d. calculate a value of deviation from expectation based at least on the mean, the normalization value, and a noise factor, e. calculate a current cumulative sum value of the customer action data based on a prior cumulative sum value and the value of the deviation from expectation, f. compare the current cumulative sum value with a preselected threshold, g. generate an informative electronic communication for the merchant server when the current cumulative sum value satisfies a compared condition with the preselected threshold, and h. repeat steps a-g.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a table that shows customer actions, according to an embodiment.

FIG. 6 is a flow chart that includes steps of a method of detecting a change in user action data, according to an embodiment.

FIG. 10 is a flow chart that includes steps of a method of detecting a change in user action data, according to another embodiment.

DETAILED DESCRIPTION

The embodiments described include methods, apparatuses, and systems for detecting changes in customer (user) behavior (action) of a merchant. Further, for at least some embodiments electronic communications are generated upon detecting the changes in customer action. For at least some embodiments, the electronic communication is correlated by an action or activity of the merchant. Once correlated, action can be automatically taken based on the detected correlation.

Figure 1:
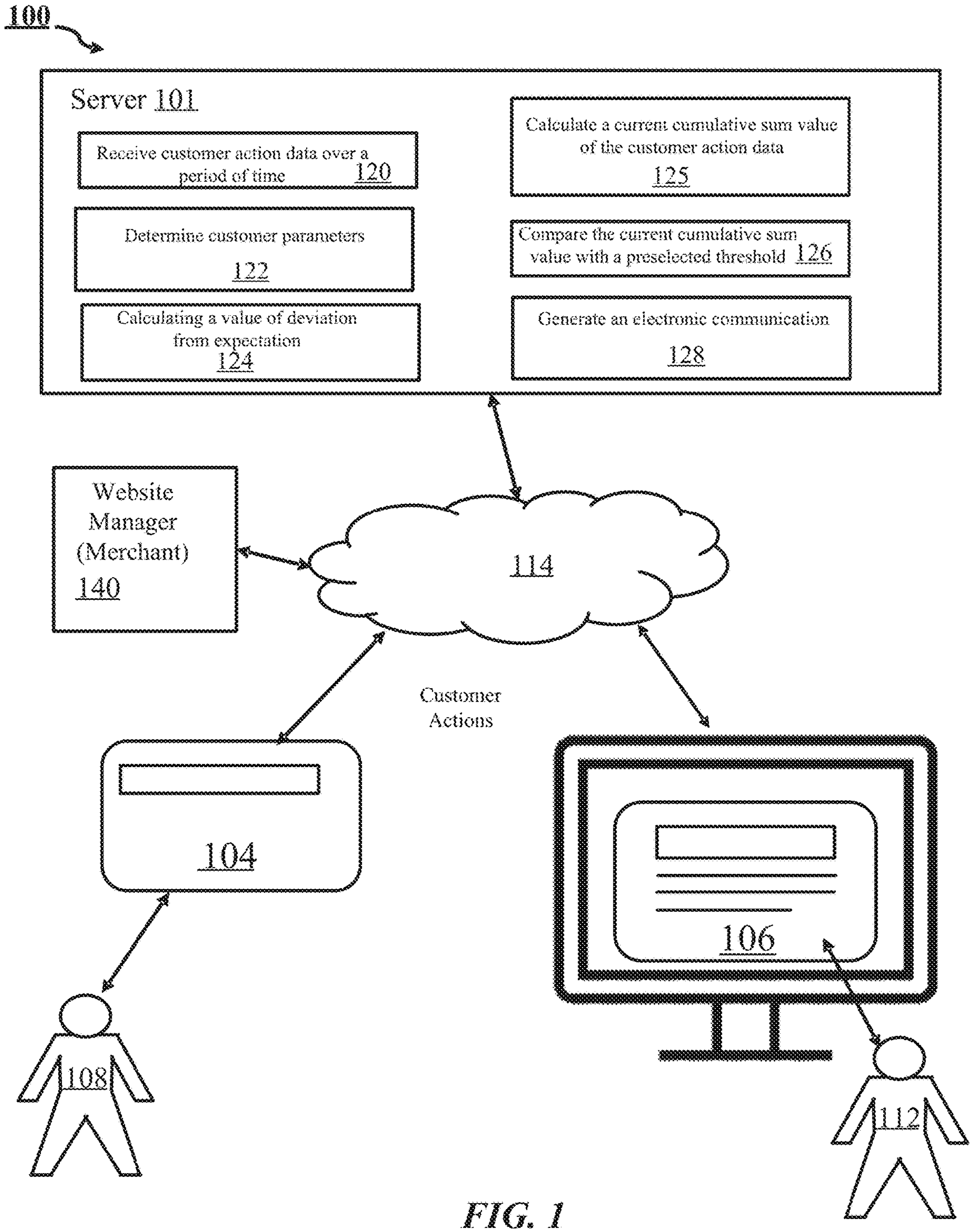
FIG. 1 shows a system for detecting changes in customer (user) behavior of a merchant, according to an embodiment.

FIG. 1 shows a system 100 for detecting changes in customer (user) behavior of a merchant, according to an embodiment. The system 100 includes a server 101. For an embodiment, the server 101 is electronically connected through a network 114 to electronic devices 104, 106 of site visitors 108, 112 of the merchant. For an embodiment, the site visitors 108, 112 are the customers (users) in which changes in behavior (customer actions) are detected.

A website manager 140 of the merchant operates and manages an ecommerce website. For an embodiment, the website manager 140 includes a server of a business of a merchant that operates to directly control the ecommerce website. For an embodiment, the website manager 140 includes a combination of the business and a third party to operate to control the ecommerce website. For an embodiment, the website manager 140 is a customer of the operator of the server 101. For an embodiment, the website manager 140 is a combination of the customer of the operator of the server 101 and a third party (such as a Shopify platform).

For an embodiment, the server 101 includes a marketing automation platform in which data is synced from other sources, such as, merchant websites and devices of customers of the merchants. For an embodiment, the server 101 continuously monitors the rate at which data (for example, customer action data) is coming into the platform of the server 101 to detect when a problem has occurred with the data syncing process.

For an embodiment, the data comes into the marketing automation platform of the server 101 through integrations set up by website managers (such as, website manager 140). For an embodiment, the integrations are not exclusively between the marketing automation platform and ecommerce platforms. For an embodiment, a custom integration with the marketing automation platform of the server 101 is possible through APIs (Application Programming Interfaces) which provides the merchants (website manager 140) a great deal of freedom in how to communicate data to the marketing automation platform of the server 101.

A simple example of a use case for communicating data to the marketing automation platform of the server 101 is when a website manager 140 sends an order confirmation message to one of their customers (108, 112) using the marketing automation platform of the server 101. Order confirmation messages are sent after an order has been placed, and the marketing automation platform of the server 101 needs to know when the customer has placed an order. In some cases, the way in which integrations or parts of integrations are set up can be fragile. For example, in some cases the operator of the merchant server 140 installs their own code snippets that communicate data to the marketing automation platform of the server 101 directly on their ecommerce websites. In such cases, the operator of the merchant server 140 could accidentally disrupt or break their code snippets when making routine updates or changes to their website. An example would be if an operator of the merchant server 140 accidentally deletes the closing bracket of an installed code snippet. To the operator of the merchant server 140 it might look like everything should be working because most of the code is still there, but the data the snippet was meant to send likely stops being transferred to the marketing automation platform of the server 101. This means that a marketing automation platform of the server 101 functionality dependent on that data will stop working. The marketing automation platform of the server 101 would not be able to directly tell if a code snippet has been changed because the code snippet is part of the merchant's ecommerce platform and not the marketing automation platform of the server 101. All the marketing automation platform of the server 101 can do is try to detect when something changes in the rate at which data is getting synced over to the platform. At least some of the described embodiments for detecting changes in customer (user) behavior of a merchant provide the marketing automation platform of the server 101 the ability to identify when data provided by a merchant server 140 stops working.

For an embodiment, the website manager (merchant server 140) of the system 100 operates to detect customer action data of, for example, site visitors 108, 112 of electronic devices 104, 106. Changes in the detected customer action data can be used to determine an action or activity that either causes customer action data to stop being communicated to the marketing automation platform of the server 101 or causes the customer action data to greatly change.

Customer Action Data

For an embodiment, a customer device (such as, devices 104, 106) alone or in conjunction with the merchant server 140 operates to sense the customer action data. For an embodiment, the sensed customer action data includes the customer device electronically sensing a customer performing an action or activity.

While the described embodiments are directed towards sensing customer action data, it is to be understood that at least some other embodiments can additionally or alternatively include the sensing of other types of data as well. For an embodiment, the sensed data can include merchant server data, such as, daily total or new visitors on the merchant website. That is, the sensed customer action data could be replaced with, for example, data of daily total or new visitors on the merchant website.

The customer action data may be tracked (counted) over various possible time periods (such as, by the second, minute, hour, day, week, or month) and may include one or more of customers (108, 112) being active on the merchant website 140, a sent email bouncing, a customer canceled order, a customer starting a checkout, a customer clicking (selecting) an email, a customer opening email, a customer placing order, a customer receiving email, a customer refunding an order, a customer unsubscribing, a customer viewing a product, a customer adding to a list (a list in the marketing automation platform of the server 101 account), and/or a customer adding an item to their cart.

It is to be understood, however, that there are very few limitations on what event types (customer actions) can be published (provided) to a marketing automation platform of the server 101 account. Website managers (merchant servers 140) can implement their own events (sensed customer actions) that make sense for their business and simply send those events over to the marketing automation platform of the server 101. For at least some embodiments, the change detection system is applied to counts of those event types (sensed customer actions) as well.

Further, as will be described, implementations of the devices 104, 106 that include mobile devices can additionally or alternatively include additional types of sensed customer actions. Such sensed customer action can include sensing a physical customer visit and/or purchase. That is, the sensing of the customer action can include sensing the customer visiting a physical location of the merchant, and/or the customer purchasing a product or service of the merchant at a physical store location of the merchant. Further, the sensed customer actions can include combinations or sequences of customer actions. For an embodiment, sensed customer actions are weighted based on the sensed customer actions. For an embodiment, only sensed customer actions having a weight, or a combination of weights that exceed a customer action threshold are considered a customer action for the purposes of detecting changes in customer behavior.

Communicating Data to the Marketing Automation Platform

For at least some embodiments, data is sent (provided) to the marketing automation platform of the server 101 through either webhooks, periodic syncs, sent to the API (application programming interface) of the marketing automation platform of the server 101, or some other means. Webhooks are automated messages that are sent shortly after an event occurs from another system such as an ecommerce platform. For an embodiment, periodic syncs are periodic tasks that are executed within the marketing automation platform of the server 101 to query 3rd-party systems or APIs for data. Such systems are in many cases integrated ecommerce platforms. For an embodiment, the marketing automation platform of the server 101 also maintains an API with which merchants of the merchant server 140 can send data to their accounts themselves.

For an embodiment, the server 101 (marketing platform server) operates (120) to receive the customer action data from the merchant server 140 over a period of time. For an embodiment, the period of time is set of selected by the merchant server and could be done in real-time, or every 5 minutes, or every 30 minutes, or every hour and so on. For an embodiment, the period is selected based on a rate in which the customer action data is sensed or provided.

For an embodiment, the server 101 (marketing platform server) further operates (122) to determine customer parameters including a mean, and a standard deviation of the customer action data. For an embodiment, the includes the mean, and the standard deviation of counts of customer action actions over periods of time.

For an embodiment, the server 101 (marketing platform server) further operates (124) to calculate a value of deviation from expectation based at least on the mean, the standard deviation, and a noise factor.

For an embodiment, the server 101 (marketing platform server) further operates (125) to calculate a current cumulative sum value of the customer action data based on a prior cumulative sum value and the value of the deviation from expectation. For an embodiment, the cumulative sum value includes a calculated value that indicates how much the customer action data has deviated from an expected output. For an embodiment, the expected value is based on a historical/past mean (for an embodiment, the expected value is an exponentially weighted moving mean). When calculating an exponentially weighted moving mean all data is used but the data from more recent time periods is given more importance. In other words, more recent data has a greater impact on the mean.

For an embodiment, how surprising an observation (deviating from the expectation) is judged to be is determined by the expectation and the historical/past variability of the data (the standard deviation). For an embodiment, an exponentially weighted moving standard deviation is used in the calculations.

An observed value for any given time period often does not exactly match the expectation (previous mean). For an embodiment, this is considered normal. For an embodiment, in the calculation of the deviation from the expectation an absolute value for how much a given value deviates from the expectation is first calculated by subtracting the mean from the value. To judge how surprising (unexpected) this deviation is, the absolute deviation is divided by the standard deviation which measures the variability of the historical data. The logic in doing so is that data that varies a lot historically is likely to vary a lot going forward and deviation in such highly variable data should be considered less unexpected. The standard deviation is larger for highly variable data and when dividing by the higher number, a smaller deviation from expectation is obtained. Finally, a noise factor (also referred to as a modified noise factor for some embodiments) is also accounted for in the last step in the calculation of deviation from expectation. Because most processes are expected to produce values that differ from the expectation, a threshold can be used to control how large deviations should be considered normal, which is the role of the noise factor. By adding the noise factor to the deviation from expectation it is ensured that if a deviation from expectation is not smaller than the negative noise factor, the deviation from the expectation is zero or positive.

As previously stated, for an embodiment, the server 101 (marketing platform server) further operates (125) to calculate a current cumulative sum value of the customer action data based on a prior cumulative sum value and the value of the deviation from expectation. For an embodiment, the server 101 (marketing platform server) further operates (126) to compare the current cumulative sum value with a preselected threshold.

Preselected Threshold (Deviation Threshold)

For an embodiment, the server 101 (marketing platform server) further operates (128) to generate an informative electronic communication for the merchant server when the current cumulative sum value satisfies a compared condition with the preselected threshold. For an embodiment, the informative electronic communication includes an alert. For an embodiment, the informative electronic communication includes an email notifying the merchant server of the alert or it could be a UI (user interface) element (like a notification or a warning icon in the marketing automation platform). As will be described, for other embodiments the informative electronic communication is correlated with other activities of the merchant and the merchant server 140 to may have an effect or influence on the behavior (actions) of the customer of merchant. For at least some embodiments, the change detection includes both negative and positive changes that can be correlated with action of the merchant.

For an embodiment, the preselected threshold is selected based on an optimization process using data in which the desired output of the change detection system has been predetermined. For an embodiment, in the optimization process, different values of the preselected threshold are evaluated, and an optimized value is chosen based on how closely the output of the change detection process matched the desired output for that particular value of the preselected threshold.

It is to be noted that some of the described embodiments include a modified threshold. A modified threshold is a preselected threshold that has been modified based on a condition.

Customer Data Rate of Change Limit

For an embodiment, the server 101 (marketing platform server) further operates to detect a value change of the customer action data and generate a revised representation of the customer action data when the value change between the customer action data and the previously determined mean, is detected to be greater than a change threshold. For an embodiment, the value change is a change in the value of the customer action data over one or a few data points. It is desirable to limit the impact of such changes.

For an embodiment, the value change between the customer action data and the previously determined mean is the difference in value between the current value of the customer action data and the mean. For an embodiment, the customer action data is aggregated by day (or another selected period of time) and compared against an exponentially weighted moving mean. Therefore, for this embodiment, the value change is the daily count of customer action events minus the exponentially weighted mean of all previous daily counts of the customer action events.

Figure 2:
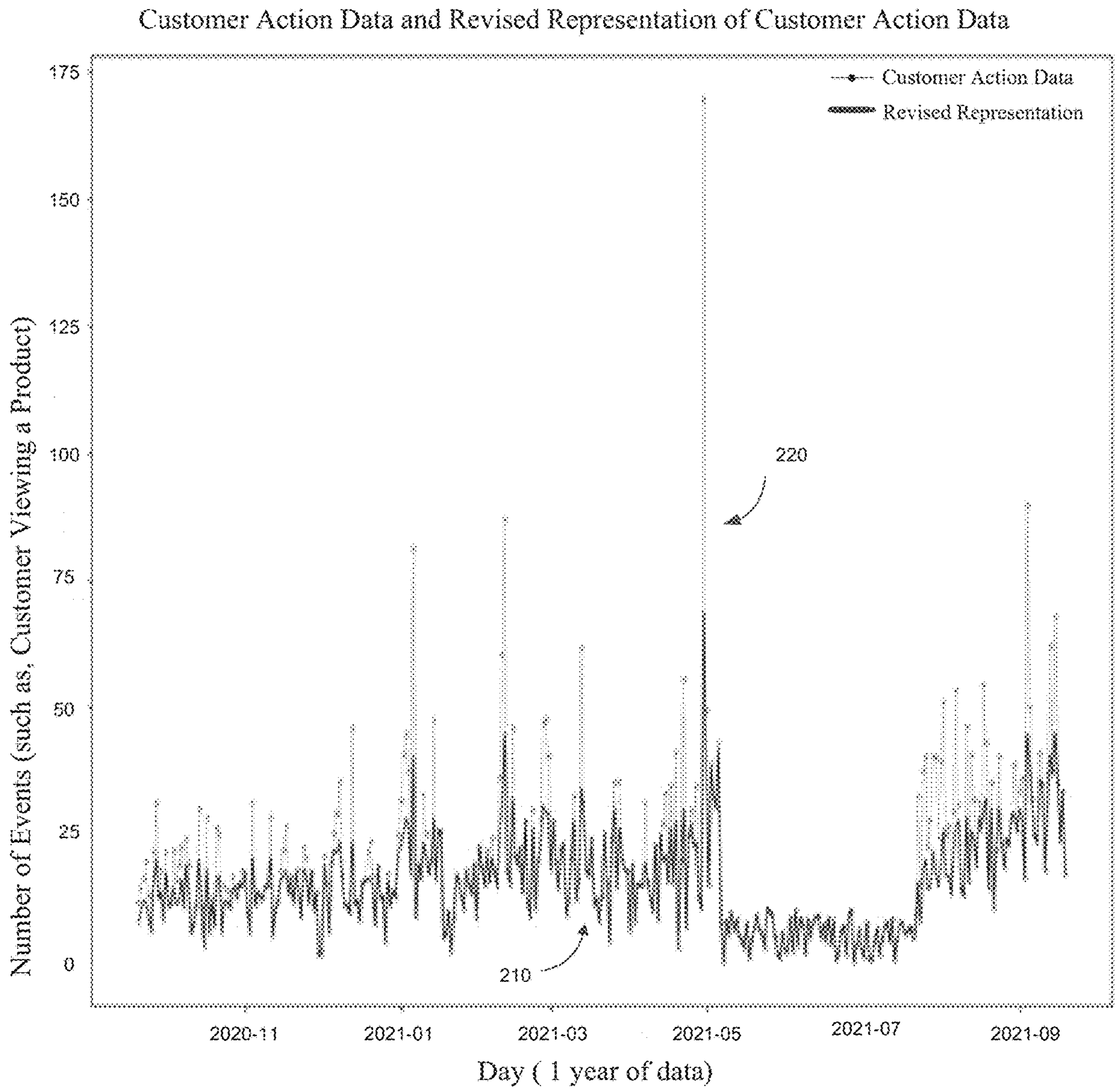
FIG. 2 is a graph that shows both customer action data over time, and a revised representation of the customer action data, according to an embodiment.

FIG. 2 is a graph that shows both customer action data 220 over time, and a revised representation 210 of the customer action data, according to an embodiment. The revised representation 210 exactly matches the customer action data 220 when the values of the customer action data are lower than, or close to, the moving mean (the mean is not plotted in the graph). When the customer action data 220 values are much higher than the moving mean, the revised representation 210 takes on values that are lower than those of the customer action data 220.

For an embodiment, the revised representation 210 of the customer action data 220 operates to limit the impact of large positive outliers. Without correction, positive outliers skew the mean and standard deviations creating scenarios in which the informative electronic communication, such as, an alarm might never trigger on valid anomalies, or trigger later on valid anomalies than had the positive outliers not occurred. For an embodiment, the revised representation of the customer action data is lower or equal to the customer action data. For an embodiment, the revised representation of the customer action data is lower than the customer action data.

For an embodiment, the change threshold is determined based on previously calculated mean and standard deviation of the customer action data, and an inertia threshold. For an embodiment, the inertia threshold is experimentally determined with different values and checking where the best performance in a manually labeled dataset is determined.

For an embodiment, the change threshold is determined based on previously calculated mean and standard deviation of the customer action data, and an inertia threshold. For an embodiment, the inertia threshold is experimentally determined by experimenting with different values and checking where the best performance is obtained based on a manually labeled dataset. For an embodiment, the manually labeled dataset is a set of sequences of customer action data over time that have been manually inspected and classified as to whether or not the customer action data contain changes that warrant detection from the change detection system. For an embodiment, best performance means that many (greater than a threshold or ratio) of the changes manually labelled as warranting change detection were correctly detected by the change detection system, and that few (less than a threshold or ratio) sequences that were manually labelled as are not warranting change detection were marked as changes by the change detection system For an embodiment, the change threshold is determined using the previously calculated mean and standard deviation, and from a threshold factor (also referred to as the inertia-threshold). For an embodiment, the inertia-threshold is set as a constant factor but since the mean and standard deviation are changing the resulting threshold is adaptable. The threshold factor varies across the input data (sensed customer action data) as the mean and standard deviations vary. For an embodiment, the inertia-threshold is set by experimenting with different values and checking where the best performance on the manually labeled dataset is obtained.

For an embodiment, the revised representation of the customer action data is adaptively determined based on previously calculated mean and standard deviation of the customer action data, an increase factor, and the inertia threshold. For an embodiment, the revised representation is determined using both the mean and standard deviation as well as a constant that is referred to as the increase-factor, and the previously mentioned inertia-threshold. The fact that the mean and standard deviations change means that the value of the revised representation is set adaptively. For an embodiment, the increase-factor is experimentally set by setting it to different values and checking for the best performance on the manually labeled dataset.

Modification of Deviation from Expectation by Limiting Values of the Standard Deviation For an embodiment, the server 101 (marketing platform server) further operates to generate a normalization value based on the standard deviation when the standard deviation is detected to be less than a deviation threshold (for an embodiment, the deviation threshold is the preselected threshold or the modified threshold). Further, calculating, by the marketing platform server the value of deviation from expectation is based at least on the mean, the normalization value, and the noise factor.

Normalization Value

When attempting to detect output changes of a data generating process that could indicate changes in the process itself, it is often desirable to know how large a given change in a value is compared to how much the value is expected to deviate. An easy way to achieve this is to divide the value change by a normalization value such as the standard deviation of the value. For an embodiment, the normalization value serves to transform the deviation into a format that quantifies how large the deviation is compared to expected deviation. For an embodiment, the standard deviation is calculated from previously seen observations of the value. For an embodiment, the standard deviation is pre-known if the process generating the data is well understood. For at least some embodiments, other normalization values than the standard deviation are selected or used.

Noise Factor

A noise factor is used to dictate to the change detection system how large a deviation from the historical mean is considered indicative of a change in the data generating process. Deviation larger than the bounds dictated by the noise factor will start to accumulate in the cumulative sum value. Noise factors can be optimized in an optimization process such as has been described previously. As will be described, for at least some embodiments, the noise factor is updated with a modified noise factor.

As previously described, for an embodiment, the noise factor (also referred to as a modified noise factor for some embodiments) is also accounted for in the last step in the calculation of deviation from expectation. Because most processes are expected to produce values that differ from the expectation, a threshold can be used to control how large deviations should be considered normal, which is the role of the noise factor. By adding the noise factor to the deviation from expectation it is ensured that if a deviation from expectation is not smaller than the negative noise factor, the deviation from the expectation is zero or positive.

For an embodiment, calculating the deviation from expectation includes a division by the standard deviation. Therefore, the expectation can become very large when the standard deviation becomes small. This in turn affects the change detection performance negatively. Therefore, limiting the value of the standard deviation makes the cumulative sum value methods for detecting changes in customer behavior more stable on data with low natural variability.

Deviation Threshold (Preselected Threshold)

The cumulative sum value quantifies how far the output of a process has deviated from the expectation. The deviation threshold or the preselected threshold (or for some embodiments, the modified threshold) is the final limit used to dictate how high or low the cumulative sum value can reach before the system should indicate that a change has occurred in the data generating process. The cumulative sum value is simply compared to the deviation threshold and the outcome of that comparison, usually whether the cumulative sum value is higher or lower than the deviation threshold, dictates the output of the change detection system as a whole.

For an embodiment, the deviation threshold is determined by experimentally observing results on a manually labeled dataset for different values of the deviation threshold. For an embodiment, the deviation threshold is determined by experimenting with different values and checking for the best performance on a manual labeled dataset. For an embodiment, the deviation threshold is experimentally determined by experimenting with different values and checking where the best performance is obtained based on the manually labeled dataset. For an embodiment, the manually labeled dataset is a set of sequences of customer action data over time that have been manually inspected and classified as to whether or not the customer action data contain changes that warrant detection from the change detection system. For an embodiment, best performance means that many (greater than a threshold or ratio) of the changes manually labelled as warranting change detection were correctly detected by the change detection system, and that few (less than a threshold or ratio) sequences that were manually labelled as are not warranting change detection were marked as changes by the change detection system An embodiment includes an optimization process for determining one or more of deviation thresholds, a minimum value of the normalization value, the noise factor, and/or the inertia threshold. For an embodiment, the optimization process includes using data where the desired output of a change detection system has been determined. In the optimization process different values are tried for one or more values of the parameters under optimization. Optimized values are determined by checking for which values of the optimization parameters the output of the change detection process most closely match the desired output. For an embodiment, most closely is within a threshold amount.

For an embodiment, the optimization parameters are determined using an optimization process. For an embodiment, the optimization process includes studying all data and for each data sequence assigning a manual label showing whether it is desirable that the system detected a change for the sequence in question. Secondly the change detection system is performed with a set of different values for the parameter being optimized. By looking at which data is correctly labeled according to the earlier definition of whether or not the system should have detected a change or not, it is possible to find values of the parameter in question that leads to good system performance. Good system performance means that there were few cases where the change detection system does not detect a change where the manual labeling indicated change detection was desirable, and few cases where the change detection system did detect a change where the manual labeling indicated that change detection was not desirable. For an embodiment, the few cases are less than a threshold value of cases in which the change detection system does or does not detect changes that the manual labeling indicates are different. As previously stated, for an embodiment, parameters that go through this optimization process include the deviation threshold, a minimum value of the normalization value, the noise factor, and the inertia threshold, or any combination of these.

Modified Noise Factor

For an embodiment, the server 101 (marketing platform server) further operates to determine a modified noise factor based on the value of the customer action data, to make the change detection system more sensitive to certain values and calculating the value of deviation from expectation based at least on the mean, the standard deviation, and the modified noise factor. For an embodiment, the modified noise factor controls how sensitive the change detection system is to changes in the customer action data.

For an embodiment, the modified noise factor is selected to make the change detection system more sensitive to situations that are likely to indicate that a change has occurred. For an embodiment, the modified noise factor is selected to make the change detection system less sensitive to situations that are unlikely to indicate that a change has occurred. For an embodiment, the modified noise factor is selected based on an observed value. For an embodiment, the modified noise factor is selected to be a small value (less than a threshold value), thereby making the change detection system sensitive when the observed value is zero.

For an embodiment, the noise factor (modified noise factor) is used in the last step in the calculation of deviation from expectation. Because most processes are expected to produce values that differ from the expectation, a threshold can be used to control how large deviations should be considered normal. This is the role of the noise factor (or modified noise factor). By adding the noise factor in the calculation of the deviation from expectation, differences of customer action data and historical mean that are small in relation to the normalization value will lead to a deviation from expectation value that is either 0 or positive. Only large negative deviations will lead to a negative deviation from expectation that accumulates in the cumulative sum value.

It is to be understood that the described embodiment can be applied to detect both positive and negative dips in the customer action data. For an embodiment, the noise factor is experimented with and set to a value that causes the processing to accumulate the cumulative sum value when there are large positive deviations.

Modified Threshold (Modified Preselected Threshold or Modified Deviation Threshold)

For an embodiment, the server 101 (marketing platform server) further operates to select a modified threshold based on a set time period value of the customer action data. For an embodiment, the set time period value includes a daily value. For an embodiment, the server 101 (marketing platform server) further operates to generate the informative electronic communication for the merchant server when the current cumulative sum value is greater than the modified threshold.

For an embodiment, the modified threshold is a modification of the preselected or deviation thresholds. For an embodiment, more than one threshold or multiple thresholds are selected, and a different threshold is used depending on the observed value.

For an embodiment, breaks in a series of time samples of the customer action data represented by zero values, are much more likely to indicate an integration problem than other daily (periodic) counts. Therefore, for an embodiment, the change detection method is more sensitive to these zero values. The threshold value is one parameter that controls the sensitivity of the change detection system. By using a different threshold for cases where the observed value is zero (0), the change detection system can be made more sensitive for these cases. For an embodiment, the threshold values used are determined by observing the data, experimenting with different threshold values and determining which threshold values provide the best performance.

Action Performed Upon Detecting Change

For an embodiment, upon detecting the change, an alert is electronically sent to the merchant operator of the merchant server. For at least some embodiment, the informative electronic communication includes one or more of an alert to the merchant of a possible problem or an alert internal staff to troubleshoot the problem. Further actions can include automatically working to resolve the problem or stopping dependent processes that might be adversely affected by the problem. For an embodiment, the informative electronic communication includes an email notifying the merchant server of the alert or it could be a UI element (like a notification or a warning icon in the marketing automation platform).

Correlating the Sensed Change in the Customer Action Data

For an embodiment, the server 101 (marketing platform server) further operates to correlate the informative electronic communication with an action of the merchant server. As previously described, for an embodiment the informative electronic communication includes an alert that is provided to the merchant server 140. The alert lets a merchant who operates the merchant server 140 know that a change in the sensed customer action data has been sensed. As previously described, the operator of the merchant server 140 may have performed an action that broke the integration of the merchant server 140 with the server 101 (marketing platform server). The informative electronic communication can be correlated to the action of the operator of the merchant server 140 to inform the operator of the merchant server 140 that the action may have broken the integration. That is, as previously described, the way in which integrations or parts of integrations are set up can be fragile. For example, this may be the case when operator of the merchant server 140 installs their own code snippets, that send over data to the marketing automation platform of the server 101, directly on their e-commerce websites. In such cases, the operator of the merchant server 140 could accidentally disrupt or break their code snippets when making routine updates or changes to their website. An example would be if an operator of the merchant server 140 accidentally deletes the closing bracket of an installed code snippet. To the merchant operator of the merchant server 140 it might look like everything should be working because most of the code is still there, but the data the snippet was meant to send likely stops being transferred to the marketing automation platform of the server 101. This means that a marketing automation platform of the server 101 functionality dependent on that particular data stops working.

It is to be understood that the detected change in the customer action data can be correlated with many other different possible actions by the server 101 (marketing platform server) or the merchant server 140. For example, for at least some embodiments the marketing platform server operates to manage electronic marketing campaigns of the merchant operator of the merchant server 140. The electronic campaigns can include marketing through the distribution of electronic messages to, for example, customers 108, 112 of the merchant. For an embodiment, detected changes in the customer action data can be correlated to changes in the electronic campaigns. For example, a new campaign may be initiated. Changes in the customer action data can be correlated with the initiation of a new campaign, or the retirement of a prior campaign. Further, the changes in the customer action data can be correlated changes in the customer list of the electronic campaigns. Further, the changes in the customer action data can be correlated changes in a merchant platform of the electronic campaigns. Merchants constantly try to improve their processes for sending out electronic campaigns by way of electronic messages to customer or potential customers. The described embodiment for detecting changes in customer activity can sense changes in customer behavior that can be correlated with changes in the processes of merchants generating electronic campaigns. The correlated with the changes can be used by merchants to identify changes that either greatly helps or severely hurt the customer experience. Accordingly, the correlations between customer action changes can be used by the merchant to automatically eliminate changes that hurt (decreased) customer actions and the automatically include changes the help (increase) customer actions.

At least some embodiments further include the marketing automation platform of the server 101 automatically performing an action upon detecting a correlation with a change in the electronic marketing campaign and the detected change in the customer action data. Such action can include, maintaining a change in the electronic marketing campaign that greatly improves the electronic campaign, and eliminating changes in the electronic marketing campaign the greatly hurts the electronic campaign.

Figure 3:
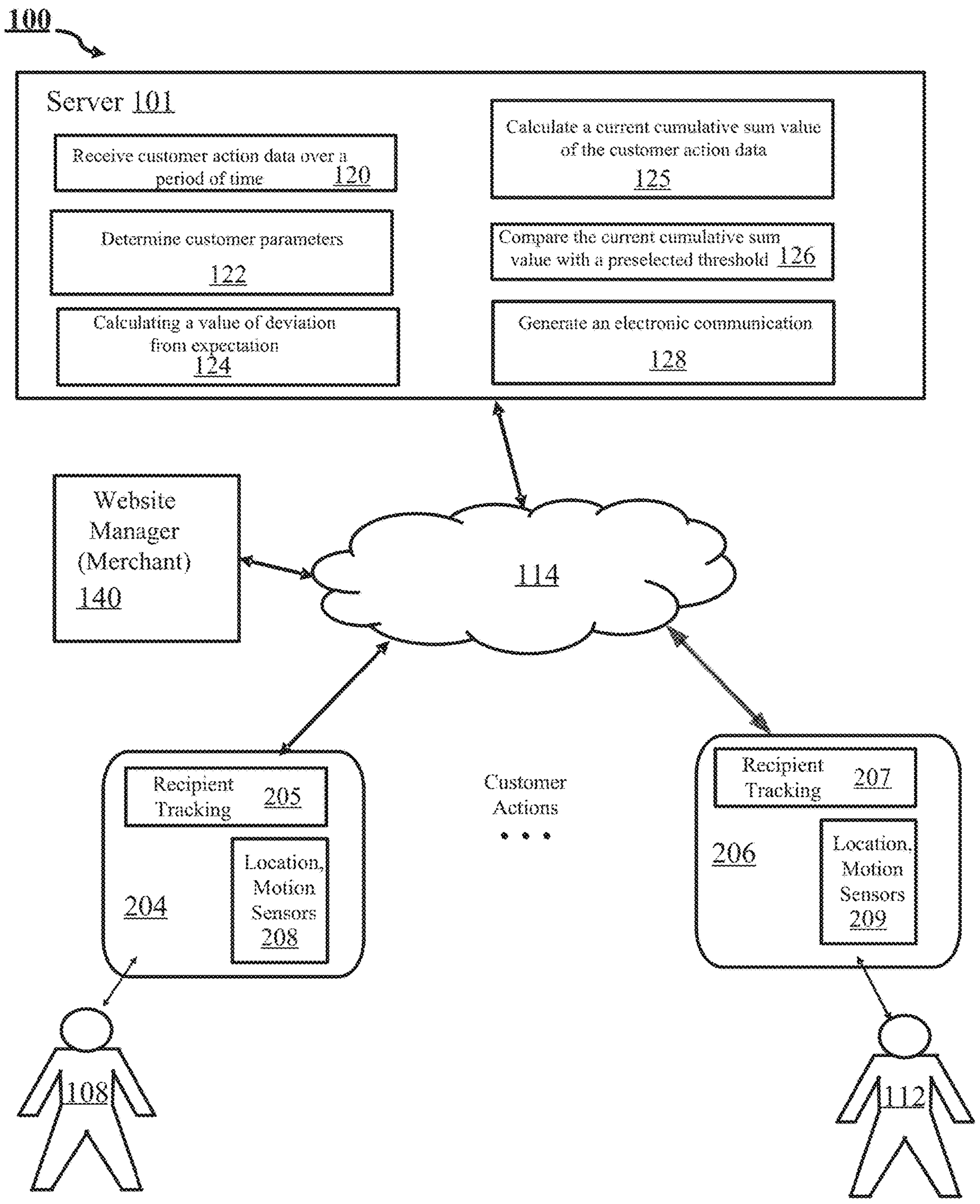
FIG. 3 shows another system for detecting changes in customer (user) behavior of a merchant, according to another embodiment.

FIG. 3 shows another system for detecting changes in customer (user) behavior of a merchant, according to another embodiment. For this embodiment, one or more customers generating the customer action data are associated with a mobile device. Accordingly, actions and physical locations of the customers can be tracked. For at least some embodiments, the tracking of motions and/or locations of the customers are used for sensing customer actions of the customers.

As shown, recipients 108, 112 operate mobile devices 204, 206. For an embodiment, the mobile device 204, 206 includes location and/or motion detection sensor 208, 209, and/or recipient tracking sensors 205, 207. The location monitoring device may include a GNSS (global network satellite system), such as, GPS (global positioning system). Further the motion detection devices of the mobile devices 204, 206 may include accelerometers, gyroscopes, and/or magnetic sensors.

For an embodiment, the location monitoring of the mobile device of the customer is used to identify business locations visited by the recipient after receiving the campaign. Different businesses can be rated, wherein particular businesses yield a higher customer action score, and other particular businesses yield a lower engagement score. The customer action score of each business can be adaptively adjusted based on the electronic campaign of the merchant and can be adjusted based on other businesses visited by the recipient. For an embodiment, patterns of location visits by the recipient can be used to influence the level of customer action.

For an embodiment, motion of the recipient is tracked, and can be used to influence the level of customer action. Certain actions (motions) of the recipient may indicate different levels of customer action. For an embodiment, the computing devices 204, 206 may include a mobile phone, a smart watch, or a headset. Motion of the recipient can include tracking hand motions, direction of eyesight, and/or orientations of the recipient. Accordingly, whether the recipient is in a physical location of a product of the merchant can be determined. Further, how long the recipient holds or looks at a specific product of the merchant can be determined. Further, whether the recipient interacts with another recipient can be determined. All the sensed/tracked locations and motions of the customer can be included within a score of the customer action. Again, a score that exceed a score threshold can be deemed a customer action.

Further, for an embodiment, different businesses physically visited can be rated, wherein particular businesses yield a higher success score and other particular businesses yield a lower success score. The success score of each business can be adaptively adjusted based on campaigns and can be adjusted based on other businesses visited by the customer. For an embodiment, patterns of location visits by the customer can be used to influence the level of success. That is, for example, visiting a location of a business can be rated higher or lower based on a previous business visited by the customer.

As previously described, the customer tracking 205, 207 can include monitoring of web browsing of the customer. Online action and activity of the customer can influence the success score. Links accessed by the customer can be tracked. Websites visited by the customer can be tracked. Online purchases of the customer can be tracked. Each of the online web browsing of the customer can influence the success score of the customer actions.

For an embodiment, relationships between different customers are determined. For example, web tracking can determine online relationships between customers. Further, for an embodiment, a real physical relationship between customers can be established by tracking the locations of the different customers. Two customers may be identified as living together based on location tracking. Further, commonalities of recipients can be determined by identifying common locations, or common types of locations between the different customers. The influence one customer has on another customer can be measured and the influence can add or subtract from the success score.

For an embodiment, a level of customer action can be adaptively adjusted for each customer based on actions of an associated customer. An action by a related or common type of customer can influence how much an action by a customer influences the engagement determination or influences a success determination.

As previously described, the success determination of the described customer actions can be scored, and a score exceeding a score threshold an qualify as a customer action which is tracked and changes identified.

FIG. 4 is a table that shows customer actions, according to an embodiment. The table shows days, and the number of customer actions (viewed product events) for each of the days. Here, the viewed product events are counts over a daily period. The data of the table is then analyzed to detect or identify changes in customer behavior. Such detected changes in customer behavior can then be correlated with an action or event.

Figure 5:
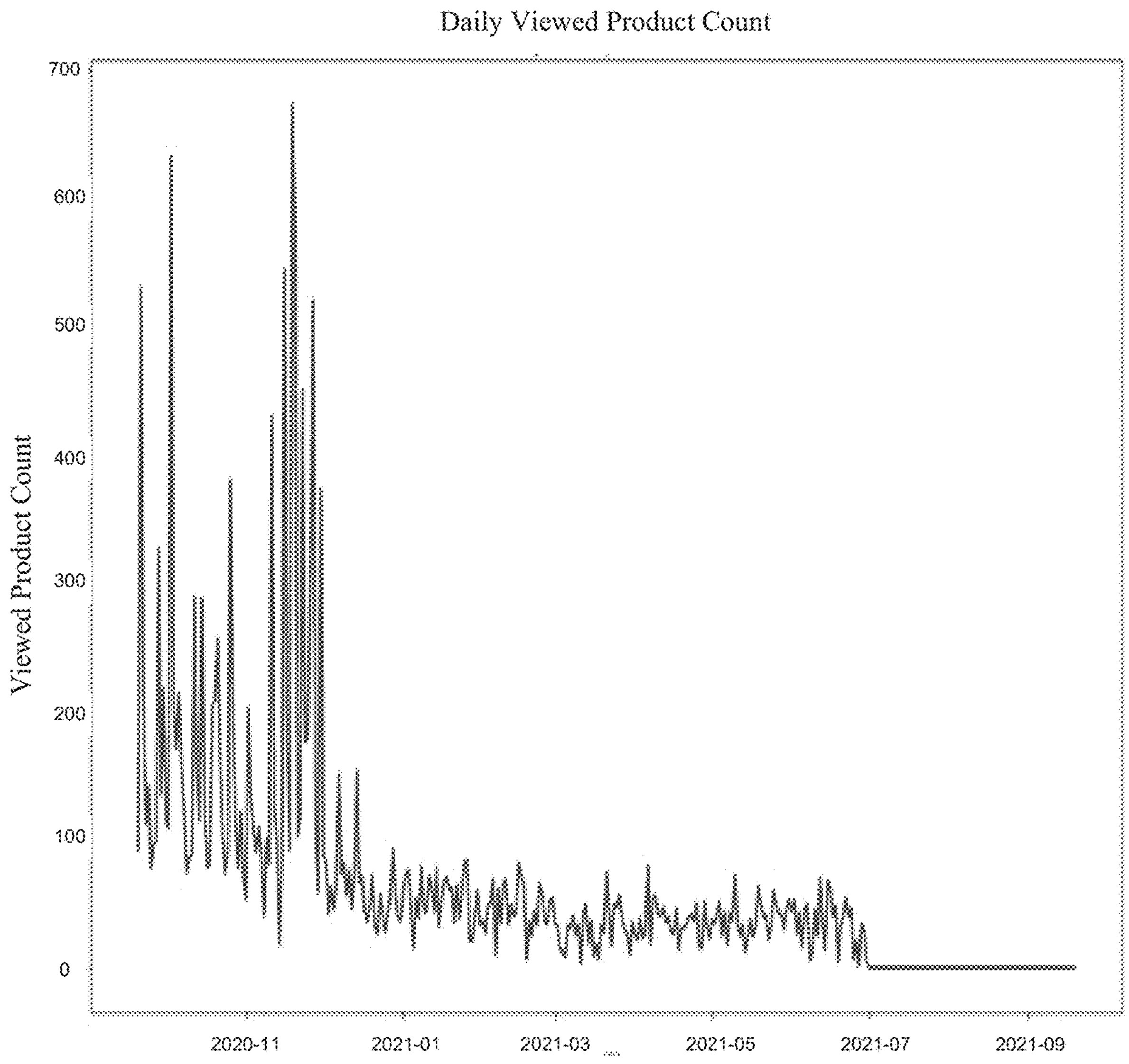
FIG. 5 is a plot of customer actions over time, according to an embodiment.

FIG. 5 is a plot of customer actions over time, according to an embodiment. The user actions include customer actions over time. For an embodiment, the customer actions include a viewed product count. For an embodiment, the viewed product count is plotted over a one year period.

FIG. 6 is a flow chart that includes steps of a method of detecting a change in user action data, according to an embodiment. A first step 510 includes a. detecting, by a merchant server, customer action data. A second step 520 includes b. receiving, by a marketing platform server, the customer action data over a period of time. A third step 530 includes c. determining, by the marketing platform server, customer parameters including a mean, and a standard deviation of the customer action data. A fourth step 540 includes d. calculating, by the marketing platform server, a value of deviation from expectation based at least on the mean, the standard deviation, and a noise factor. A fifth step 550 includes e. calculating a current cumulative sum value of the customer action data based on a prior cumulative sum value and the value of the deviation from expectation. A sixth step 560 includes f. comparing the current cumulative sum value with a preselected threshold. A seventh step 570 includes g. generating an informative electronic communication for the merchant server when the current cumulative sum value satisfies a compared condition with the preselected threshold. An eighth step 580 includes h. repeating steps b-g.

Figure 7:
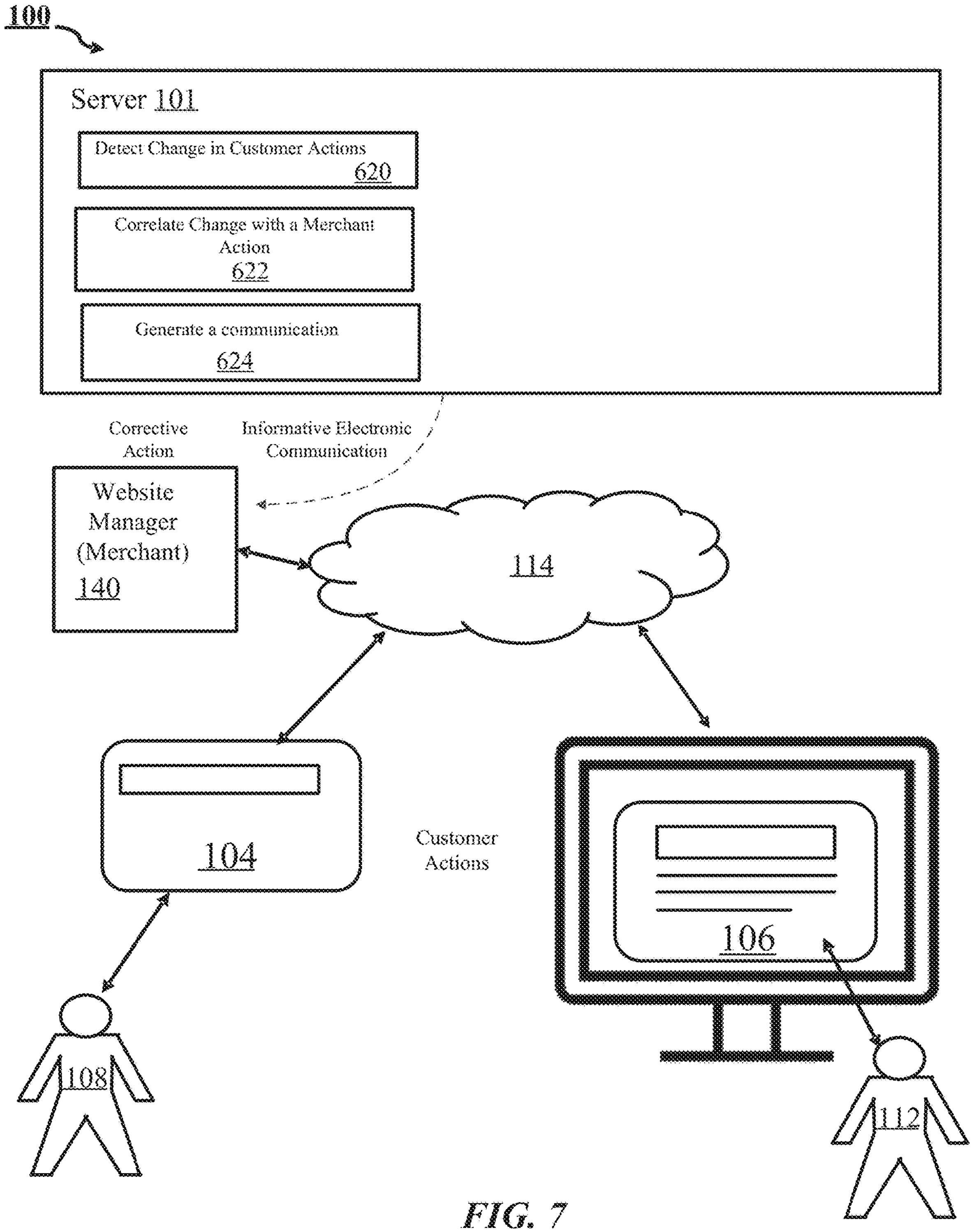
FIG. 7 shows a system for detecting changes in customer (user) behavior of a merchant, correlating the detected change with an action, and providing a corrective action, according to an embodiment.

FIG. 7 shows a system for detecting changes in customer (user) behavior of a merchant, correlating the detected change with an action, and providing a corrective action, according to an embodiment. That is, the described embodiments can be used for detecting changes in the customer action 620. Once the change in the customer behavior has been detected, the change can be correlated with an action by the merchant 622. Such action can include changes the merchant made in the integration of the sensing of customer action data with the marketing automation platform of the server 101. For an embodiment, an electronic communication (such as an alert) is provided to the merchant operator of the merchant server 140 upon detection of the change in the customer actions.

As previously stated, for at least some embodiments, the informative electronic communication is correlated with one or more events or activities of the merchant 622. For an embodiment, an electronic messaging action of the merchant is correlated with an action of the operator of the merchant server that broke the integration of the merchant server 140 with the server 101 (marketing platform server). The informative electronic communication can be correlated to the action of the operator of the merchant server 140 to inform the operator of the merchant server 140 that the action may have broken the integration.

For an embodiment, the informative electronic communication is correlated is correlated with many other different possible actions by the server or the merchant server. For example, for at least some embodiments the marketing platform server operates to manage electronic marketing campaigns of the merchant operator of the merchant server. The electronic campaigns can include marketing through the distribution of electronic messages to, for example, customers of the merchant. For an embodiment, detected changes in the customer action data can be correlated to changes in the electronic campaigns. For example, a new campaign may be initiated. Changes in the customer action data can be correlated with the initiation of a new campaign, or the retirement of a prior campaign. Further, the changes in the customer action data can be correlated changes in the customer list of the electronic campaigns. Further, the changes in the customer action data can be correlated changes in the merchant platform of the electronic campaigns. Merchants constantly try to improve their processes for sending out electronic campaigns by way of electronic messages to customer or potential customers. The described embodiment for detecting changes in customer activity can sense changes in customer behavior that can be correlated with changes in the processes of merchants generating electronic campaigns. The correlated with the changes can be used by merchants to identify changes that either greatly helps or severely hurt the customer experience. Accordingly, the correlations between customer action changes can be used by the merchant to automatically eliminate changes that hurt (decreased) customer actions and the automatically include changes the help (increase) customer actions. For example, a new electronic campaign or new customer list of electronic messages of the electronic campaign may be really good or really bad and generates the informative electronic message due to a large (detected) change in customer actions. Accordingly, a good campaign or updated customer list can be maintained. Further, a new campaign or customer list that generates a detected (drop) is customer actions may be suspended.

At least some embodiments further include the marketing automation platform of the server 101 automatically performing an action upon detecting a correlation with a change in the electronic marketing campaign and the detected change in the customer action data. Such action can include, maintaining a change in the electronic marketing campaign that greatly improves the electronic campaign, and eliminating changes in the electronic marketing campaign the greatly hurts the electronic campaign.

Figure 8:
FIG. 8 is a flow chart that includes steps of a method of detecting a change in user action data, according to another embodiment.

FIG. 8 is a flow chart that includes steps of a method of detecting a change in user action data, according to another embodiment. A first step 710 includes a. detecting, by a merchant server, customer action data. A second step 720 includes b. receiving, by a marketing platform server, the customer action data over a period of time. A third step 730 includes c. detecting a value change of the customer action data. A fourth step 740 includes d. generating, by the marketing platform server, a revised representation of the customer action data when the value change between the customer action data and the previous determined mean, is detected to be greater than a change threshold. A fifth step 750 includes determining, by the marketing platform server, customer parameters including a mean, and a standard deviation of the revised representation customer action data. A sixth step 760 includes f. calculating, by the marketing platform server, a value of deviation from expectation based at least on the mean, the standard deviation, and a noise factor. A seventh step 770 includes g. calculating a current cumulative sum value of the customer action data based on a prior cumulative sum value and the value of the deviation from expectation. An eighth step 780 includes h. comparing the current cumulative sum value with a preselected threshold. A ninth step 790 includes i. generating an informative electronic communication for the merchant server when the current cumulative sum value satisfies a compared condition with the preselected threshold. A tenth step 795 includes j. repeating steps b-i.

For an embodiment, the value change is a change in the value of the customer action data over one or a few data points. It is desirable to limit the impact of such changes.

As previously described, for an embodiment, the value change between the customer action data and the previously determined mean is simply the difference in value between the current value of the customer action data and the mean. For an embodiment, the customer action data is aggregated by day and compared against an exponentially weighted moving mean. Therefore, for this embodiment, the value change is the daily count of customer action events minus the exponentially weighted mean of all previous daily counts of the customer action events.

As previously described, FIG. 2 is a graph that shows both customer action data over time, and a revised representation of the customer action data, according to an embodiment. The revised representation exactly matches the customer action data when the values of the customer action data are lower than, or close to, the moving mean (the mean is not plotted in the graph). When the customer action data values are much higher than the moving mean, the revised representation takes on values that are lower than those of the customer action data.

As previously described, for an embodiment, the revised representation of the customer action data operates to limit the impact of large positive outliers. Without correction, positive outliers skew the means and standard deviations creating scenarios in which the informative electronic communication, such as, an alarm might never trigger on valid anomalies. For an embodiment, the revised representation of the customer action data is lower or equal to the customer action data.

As previously described, for an embodiment, the change threshold is determined based on previously calculated mean and standard deviation of the customer action data, and an inertia threshold. For an embodiment, the inertia threshold is experimentally determined with different values that are checked by determining where the best performance in a manually labeled dataset.

As previously described, for an embodiment, the threshold is determined using the previously calculated mean and standard deviation, and also from a threshold factor (also referred to as the inertia threshold). For an embodiment, the inertia-threshold (inertia threshold) is set as a constant factor but since the mean and standard deviation are changing the resulting threshold is adaptable. The threshold factor varies across the input data (sensed customer action data) as the mean and standard deviations vary. For an embodiment, the inertia-threshold is set by experimenting with different values and checking where the best performance on the manually labeled dataset.

Figure 9:
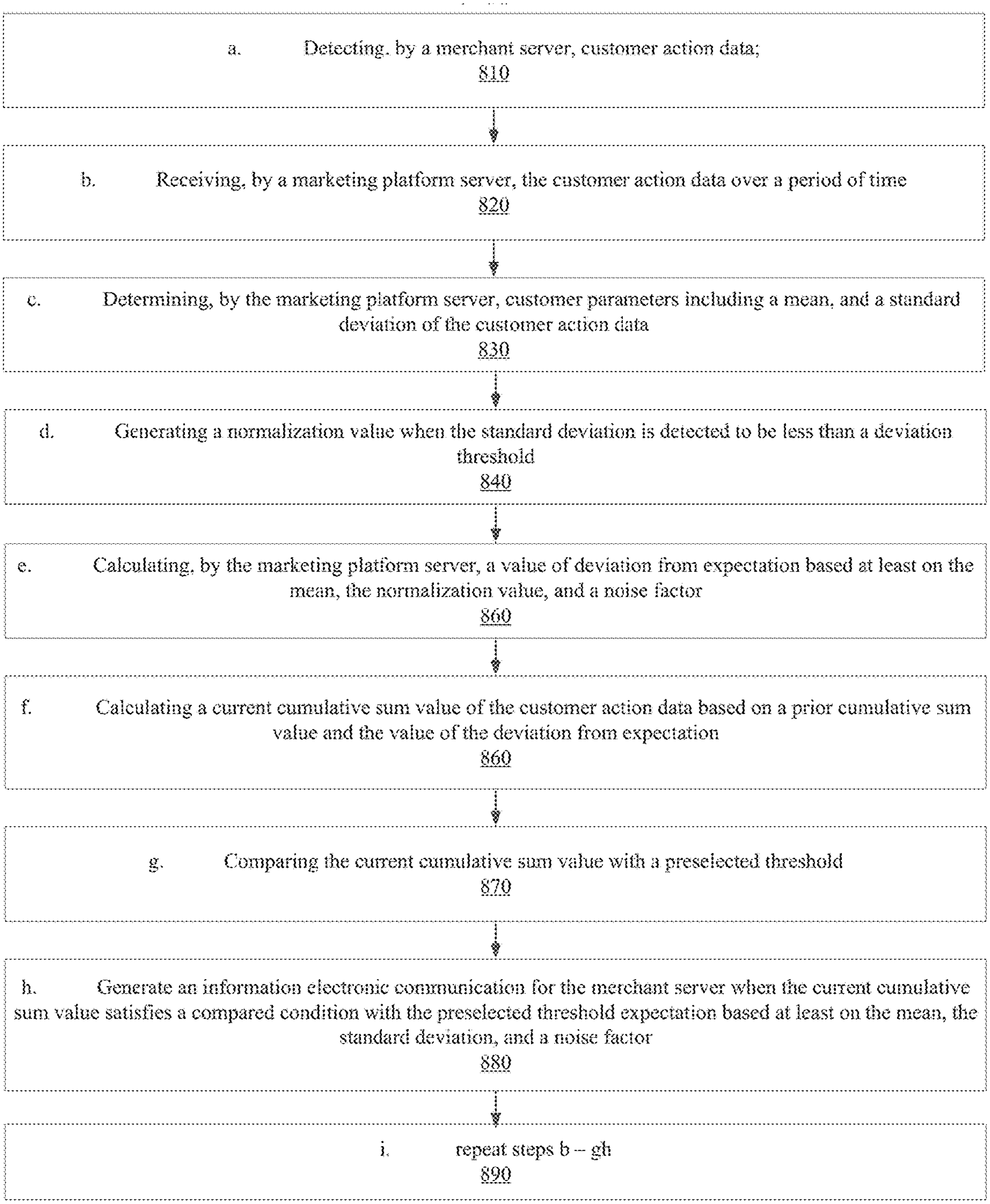
FIG. 9 is a flow chart that includes steps of a method of detecting a change in user action data, according to another embodiment.

For an embodiment, the best or ideal performance occurs when the change detection system detects a change for all the cases in which manual labeling indicates that change detection was desirable, and never detects a change when the manual labeling indicates that change detection was not desirable. For an embodiment, to measure the performance of the change detection system, a number of true positive and false positive cases detected by the system is computed. For an embodiment, the true positive cases are cases wherein the change detection system detects a change where the manual labeling indicates that change detection was desirable. For an embodiment, false positive cases are cases wherein the change detection system detects a change where the manual labeling indicated that change detection was not desirable. Ideally, the change detection system has zero false positives and the same number of true positives as the number of manually labeled anomalies. However, this is rarely achieved in practice and there is almost always a tradeoff between the two measurements. For an embodiment, optimizing performance the change detection system includes maximum number of true positive cases while keeping the false positive cases as low as possible. As previously described, for an embodiment, the inertia threshold is experimentally determined by experimenting with different values and checking where the best performance is obtained based on a manually labeled dataset. For an embodiment, the manually labeled dataset is a set of sequences of customer action data over time that have been manually inspected and classified as to whether or not the customer action data contain changes that warrant detection from the change detection system. For an embodiment, best performance means that many (greater than a threshold or ratio) of the changes manually labelled as warranting change detection were correctly detected by the change detection system, and that few (less than a threshold or ratio) sequences that were manually labelled as are not warranting change detection were marked as changes by the change detection system As previously described, for an embodiment, the revised representation of the customer action data is adaptively determined based on previously calculated mean and standard deviation of the customer action data, an increase factor, and an inertia threshold. For an embodiment, the revised representation is determined using both the mean and standard deviation as well as a constant that is called the increase-factor (increase factor), and the previously mentioned inertia-threshold (inertia threshold). The fact that the mean and standard deviations change means that the value of the revised representation is set adaptively. For an embodiment, the increase-factor is experimentally set by setting it to different values and checking for the best performance on the manually labeled dataset. As previously described, for an embodiment, the manually labeled dataset is a set of sequences of customer action data over time that have been manually inspected and classified as to whether or not the customer action data contain changes that warrant detection from the change detection system. For an embodiment, best performance means that many (greater than a threshold or ratio) of the changes manually labelled as warranting change detection were correctly detected by the change detection system, and that few (less than a threshold or ratio) sequences that were manually labelled as are not warranting change detection were marked as changes by the change detection system FIG. 9 is a flow chart that includes steps of a method of detecting a change in user action data, according to another embodiment.

A first step 810 includes a. detecting, by a merchant server, customer action data. A second step 820 includes b. receiving, by a marketing platform server, the customer action data over a period of time. A third step 830 includes c. determining, by the marketing platform server, customer parameters including a mean, and a standard deviation of the customer action data. A fourth step 840*d*. generating a normalization value when the standard deviation is detected to be less than a deviation threshold. A fifth step 850 includes e. calculating, by the marketing platform server, a value of deviation from expectation based at least on the mean, the normalization value, and a noise factor. A sixth step 860 includes f. calculating a current cumulative sum value of the customer action data based on a prior cumulative sum value and the value of the deviation from expectation. A seventh step 870 includes g. comparing the current cumulative sum value with a preselected threshold. An eighth step 880 includes h. generating an informative electronic communication for the merchant server when the current cumulative sum value satisfies a compared condition with the preselected threshold. A ninth step 890 includes i. repeating steps b-h.

For an embodiment, the calculation of the deviation from the expectation includes first calculating an absolute value for how much a given value deviates from the expectation by subtracting an exponentially moving mean from the value in question. In order to judge how surprising this deviation is we divide by the normalization value. The normalization value is based on the past standard deviation of the customer action data which measures the variability of the historical data. The logic in dividing by this number is that data that varies a lot historically is likely to vary a lot going forward, and deviations in such highly variable data should be considered less surprising. The standard deviation will be larger for highly variable data and when dividing by that higher number, a smaller deviation from expectation is obtained. However, when the standard deviation becomes very small, division by such small values will tend to over inflate the importance of modest variations in the customer action data, leading to false alarms. In order to limit these false alarms the normalization value is not strictly equal to the standard deviation of the data. Instead there is a lower threshold for how small the normalization value is allowed to get. When the standard deviation is lower than this threshold the normalization value takes on the value of the threshold instead.

FIG. 10 is a flow chart that includes steps of a method of detecting a change in user action data, according to another embodiment.

A first step 910 includes a. detecting, by a merchant server, customer action data. A second step 920 includes b. receiving, by a marketing platform server, the customer action data over a period of time. A third step 930 includes c. determining, by the marketing platform server, customer parameters including a mean, and a standard deviation of the customer action data. A fourth step 940 includes d. determining, by the marketing platform server, a modified noise factor based on the value of the customer action data, to make the change detection system more sensitive to certain values. A fifth step 950 includes e. calculating, by the marketing platform server, the value of deviation from expectation based at least on the mean, the standard deviation, and the modified noise factor. A sixth step 960 includes f. calculating a current cumulative sum value of the customer action data based on a prior cumulative sum value and the value of the deviation from expectation. A seventh step 970 includes comparing the current cumulative sum value with a preselected threshold. An eighth step 980 includes h. generating an informative electronic communication for the merchant server when the current cumulative sum value satisfies a compared condition with the preselected threshold. A ninth step 990 includes i. repeating steps b-h.

For an embodiment, the modified noise factor is determined based on the value of the customer action data, to make the change detection system more sensitive to certain values. For an embodiment, the value of deviation from expectation is calculated based at least on the mean, the standard deviation, and the modified noise factor. For an embodiment, the modified noise factor controls how sensitive the change detection system is to changes in the customer action data.

For an embodiment, the noise factor (modified noise factor) is used in the last step in the calculation of deviation from expectation. Because most processes are expected to produce values that differ from the expectation, a threshold can be used to control how large deviations should be considered normal. This is the role of the noise factor. By adding the noise factor in the calculation of the deviation from expectation, differences of customer action data and historical mean that are small in relation to the normalization value will lead to a deviation from expectation value that is either 0 or positive. Only large negative deviations will lead to a negative deviation from expectation that accumulates in the cumulative sum value.

It is to be understood that the described embodiment can be applied to detect both positive and negative dips in the customer action data. For an embodiment, the noise factor is experimented with and set to a value that causes the processing to accumulate the cumulative sum value when there are large positive deviations.

Figure 11:
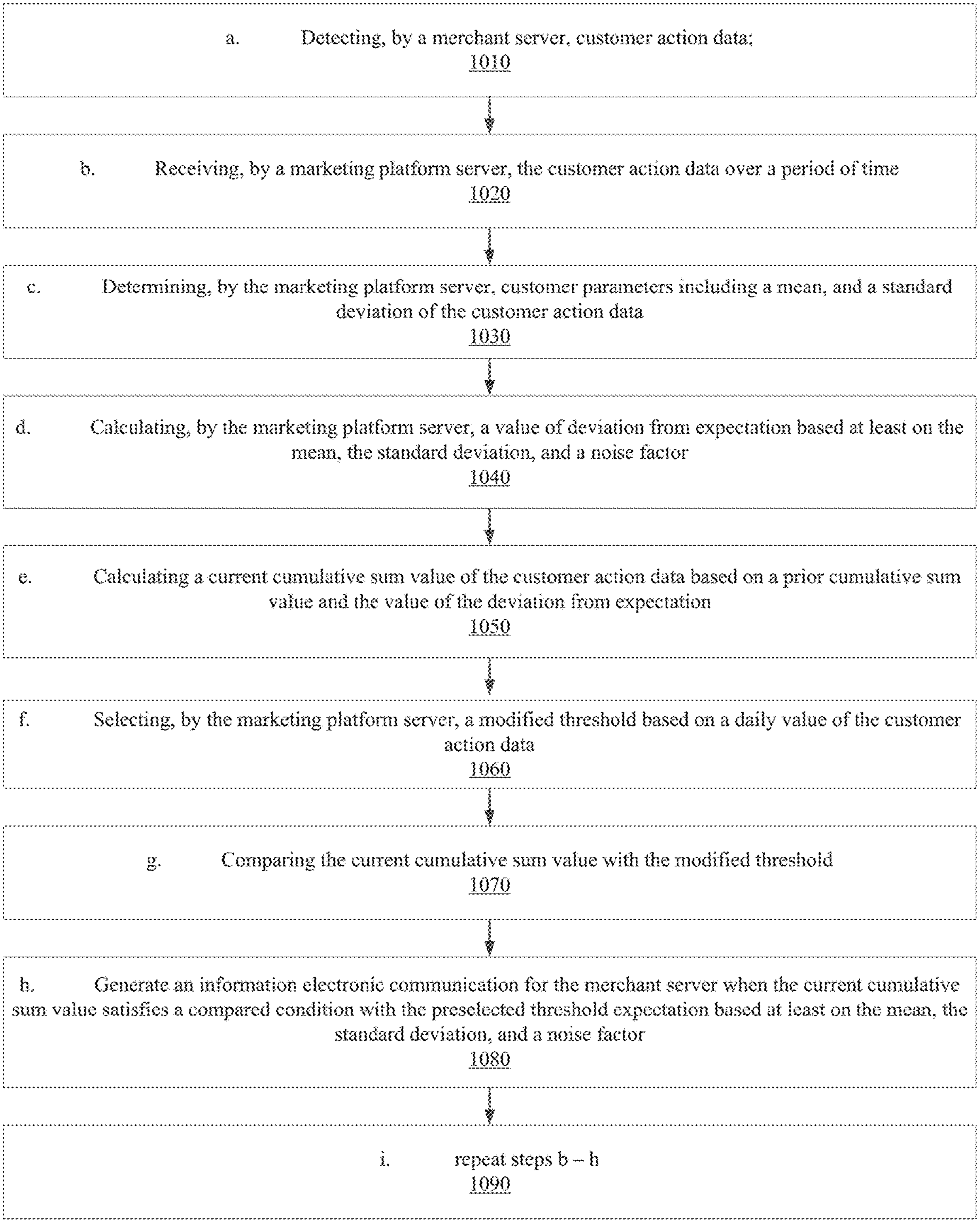
FIG. 11 is a flow chart that includes steps of a method of detecting a change in user action data, according to another embodiment.

FIG. 11 is a flow chart that includes steps of a method of detecting a change in user action data, according to another embodiment.

A first step 1010 includes a. detecting, by a merchant server, customer action data. A second step 1020 includes b.

receiving, by a marketing platform server, the customer action data over a period of time. A third step 1030 includes c. determining, by the marketing platform server, customer parameters including a mean, and a standard deviation of the customer action data. A fourth step 1040 includes d. calculating, by the marketing platform server, a value of deviation from expectation based at least on the mean, the standard deviation, and a noise factor. A fifth step 1050 includes e. calculating a current cumulative sum value of the customer action data based on a prior cumulative sum value and the value of the deviation from expectation. A sixth step 1060 includes f. selecting, by the marketing platform server, a modified threshold based on a set time period value of the customer action data. A seventh step 1070 includes g. comparing the current cumulative sum value with the modified threshold. An eighth step 1080 includes h. generating an informative electronic communication for the merchant server when the current cumulative sum value satisfies a compared condition with the preselected threshold. A ninth step 1090 includes repeating steps b-h.

Although specific embodiments have been described and illustrated, the embodiments are not to be limited to the specific forms or arrangements of parts so described and illustrated. The described embodiments are to only be limited by the claims.

What is claimed:

1. A method of a computing system detecting changes in customer behavior, comprising:

a. detecting, by a merchant server, customer action data, wherein the customer action data is sensed by a plurality of computing devices of users;

b. receiving, by a marketing platform server, the customer action data from the merchant server over a period of time;

c. detecting a value change of the customer action data;

d. generating, by the marketing platform server, a revised representation of the customer action data when the value change between the customer action data and a previous determined mean, is detected to be greater than a change threshold, wherein the change threshold is determined based on previously calculated mean and standard deviation of the customer action data, and an inertia threshold, wherein the inertia threshold is experimentally determined by checking various values of the inertia threshold and determining a performance based on a manually labeled dataset;

e. determining, by the marketing platform server, customer parameters including a mean, and a standard deviation of the revised representation of the customer action data;

f. generating a normalization value based on the standard deviation when the standard deviation is detected to be less than a deviation threshold;

g. calculating, by the marketing platform server, a value of deviation from expectation based at least on the mean, the normalization value, and a noise factor;

h. calculating a current cumulative sum value of the revised representation of the customer action data based on a prior cumulative sum value and the value of the deviation from expectation;

i. comparing the current cumulative sum value with a preselected threshold;

j. identifying that the customer action data received from the merchant server has stopped working, thereby identifying a problem with data syncing with the customer action data between the merchant server and the marketing platform server when the current cumulative sum value satisfies a compared condition with the preselected threshold;

k. repeating steps b-j;

l. Generating an informative electronic communication for the merchant server alerting the merchant server of the problem when identifying that the customer action data received from the merchant server has stopped working; and automatically stopping dependent processes adversely affected by the problem.

2. The method of claim 1, further comprising automatically working to resolve the problem.

3. The method of claim 1, wherein the cumulative sum value comprises a calculated value that indicates how much the customer action data has deviated from an expected output.

4. The method of claim 3, wherein the revised representation of the customer action data is lower.

5. The method of claim 1, further comprising:

determining, by the marketing platform server, a modified noise factor based on the value of the customer action data, to make the computing system more sensitive to certain values; and calculating, by the marketing platform server, the value of deviation from expectation based at least on the mean, the standard deviation, and the modified noise factor.

6. The method of claim 5, wherein the modified noise factor is used in a last step in calculation of a deviation from expectation, and wherein when the customer action data and a historical mean are less than a preselected fraction of the normalization value, then the customer action data and the historical mean provide a deviation from expectation value that is either zero or positive.

7. The method of claim 5, wherein the modified noise factor controls how sensitive the computing system is to changes in the customer action data.

8. The method of claim 1, further comprising:

selecting, by the marketing platform server, a modified threshold based on a set time period value of the customer action data; and generating the informative electronic communication for the merchant server when the current cumulative sum value is greater than the modified threshold.

9. The method of claim 8, wherein breaks in sensing of the customer action data are represented by zero values that are more likely to indicate an integration problem than other counts of customer action data, and wherein modified threshold provides greater change detection sensitivity for customer action data represented by zero values.

10. The method of claim 1, further comprising correlating the informative electronic communication with an action of the merchant server.

11. The method of claim 10, wherein the action of the merchant server includes a change in an electronic marketing campaign of a merchant of the merchant server.

12. The method of claim 11, wherein the change of the electronic marketing includes a change in content or display of electronic messages of the electronic marketing campaign.

13. The method of claim 11, wherein the change of the electronic marketing includes a change in recipients of electronic messages of the electronic marketing campaign.

14. The method of claim 10, further comprising automatically enhancing the correlated action, or automatically eliminating the correlated action.

15. The method of claim 1, further comprising:

sensing, by mobile devices, locations and motion of users of the mobile devices;

detecting the customer action data based on the sensed locations and motion of the users of the mobile devices.

16. The method of claim 15, further comprising:

sensing a plurality of activities of the users of the mobile devices based on the sensed location and motion of the users of the mobile devices;

detecting the customer action data based on combinations of the plurality of activities of the users of the mobile devices.

17. A computing system detecting changes in customer behavior comprising:

a merchant server electronically connected to a plurality of customer devices, the merchant server operative to detect customer action data from the customer devices;

a marketing platform server electronically connected to the merchant server, the marketing platform configured to:

a. receive the customer action data from the merchant server over a period of time;

b. detect a value change of the customer action data;

c. generate a revised representation of the customer action data when the value change between the customer action data and a previous determined mean, is detected to be greater than a change threshold, wherein the change threshold is determined based on previously calculated mean and standard deviation of the customer action data, and an inertia threshold, wherein the inertia threshold is experimentally determined by checking various values of the inertia threshold and determining a performance based on a manually labeled dataset d. determine customer parameters including a mean, and a standard deviation of the revised representation of the customer action data;

e. generate a normalization value based on the standard deviation when the standard deviation is detected to be less than a deviation threshold;

f. calculate a value of deviation from expectation based at least on the mean, the normalization value, and a noise factor;

g. calculate a current cumulative sum value of the revised representation of the customer action data based on a prior cumulative sum value and the value of the deviation from expectation;

h. compare the current cumulative sum value with a preselected threshold;

i. identify that the customer action data received from the merchant server has stopped working, thereby identifying a problem with data syncing with the customer action data between the merchant server and the marketing platform server when the current cumulative sum value satisfies a compared condition with the preselected threshold;

j. repeat steps a-i; and k. generate an informative electronic communication for the merchant server alerting the merchant server of the problem when identifying that the customer action data received from the merchant server has stopped working;

wherein the marketing platform is further configured automatically stop dependent processes adversely affected by the problem.

18. The computing system of claim 17, wherein the marketing platform is further configured automatically work to resolve the problem.

* * * * *